March 18, 1952  L. BESS  2,589,767
VOLTAGE PULSE GENERATING CIRCUIT
Filed Oct. 19, 1945
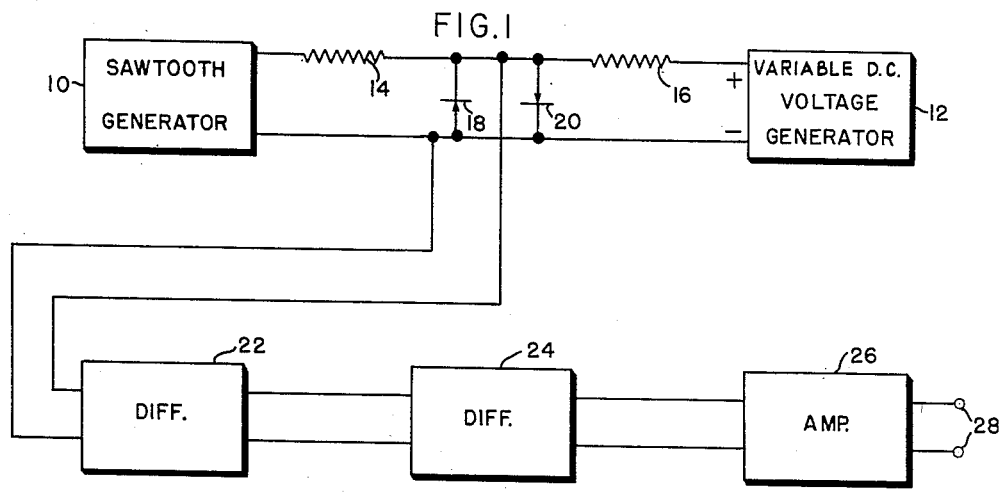
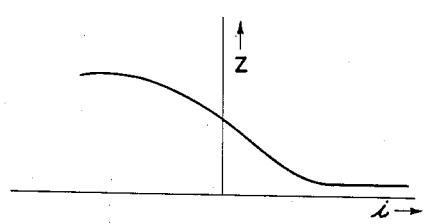
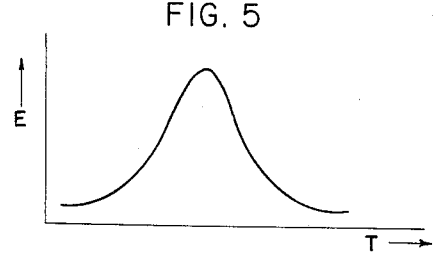
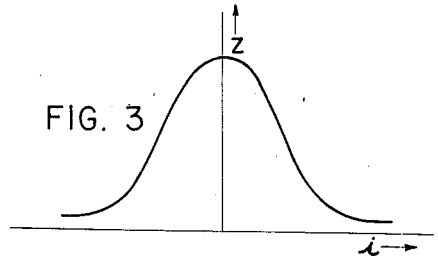
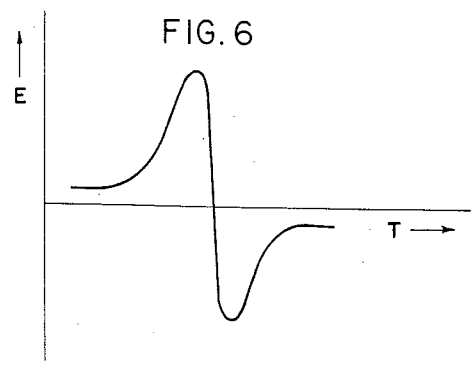
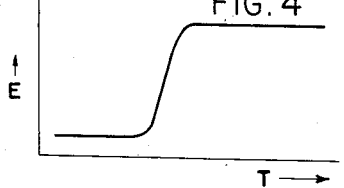
INVENTOR.
LEON BESS
BY
*William D. Hall.*
ATTORNEY Patented Mar. 18, 1952

2,589,767

UNITED STATES PATENT OFFICE 2,589,767

VOLTAGE PULSE GENERATING CIRCUIT

Leon Bess, Boston, Mass., assignor, by mesne assignments, to the United States of America as represented by the Secretary of War Application October 19, 1945, Serial No. 623,391

6 Claims. (Cl. 171—97)

This invention relates generally to electrical circuits and more particularly to a pulse generator circuit having a variable delay means.

It is frequently desirable to produce a periodic pulse, the phase of which with respect to another periodic voltage wave of the same repetition frequency may be varied. A special case is that of a circuit for use with the cathode ray indicator of an object locating system in which a D.-C. voltage is produced proportional in magnitude to the computed range of an object, and it is desired to produce a marker on the screen of the indicator to correspond with this computed range. For this purpose it is necessary to produce a periodic pulse delayed by an interval after the start of each sweep of the electron beam, this interval being proportional in duration to the computed range. Since the generator of the D.-C. range voltage may have a high output impedance, it is further desirable to provide a pulse generator which possesses a high input impedance to match that of the range voltage generator.

It is therefore an object of the present invention to provide a novel generator for producing periodic pulses, each being delayed with respect to a periodic input voltage by an amount which is proportional to the magnitude of a second input voltage. It is a further object of the invention to provide this generator with a high input impedance.

Other objects, features, and advantages of this invention will suggest themselves to those skilled in the art and will become apparent from the following description of the invention taken in connection with the accompanying drawing in which:

Fig. 1 is a block diagram of a circuit embodying the principles of the present invention;

Fig. 2 is a curve showing the variation of impedance with current for a single crystal of the type incorporated in the invention;

Fig. 3 is a curve showing the variation of impedance with current for two crystals of the same type connected as in the circuit of the invention;

Fig. 4 shows the waveform of the voltage occurring across the parallel crystal combination;

Fig. 5 shows the waveform obtained when the waveform of Fig. 4 is differentiated; and Fig. 6 shows the waveform obtained when the waveform of Fig. 5 is differentiated.

Reference is now made particularly to Fig. 1, in which the output terminals of a sawtooth generator 10 and a variable D.-C. voltage generator 12 are connected in series with resistors 14 and 16 in such a way that the generators tend to produce currents in opposite directions. Crystals 18 and 20 are connected in parallel between the junction of resistors 14 and 16 and the junction between generators 10 and 12. Resistors 14 and 16 may have any value large in comparison with the forward impedance of crystals 18 and 20, the latter being connected so that their low-impedance directions are opposite. Generator 10 may be any conventional sawtooth generator common in the art and having a repetition period equal to that desired for the final output pulse from the circuit.

Generator 12 may be a potentiometer connected across a source of constant D.-C. potential, or, if the invention is to be used for the purpose described above in connection with an object located system, it may be a ground range or slant range voltage generator. A ground range voltage generator suitable for this purpose is described in the copending application for a Bombing Computer, by John W. Gray and Duncan MacRae, Jr., Serial No. 598,162, filed June 7, 1945. A source of voltage proportional to slant range may be produced by applying the output of the ground range voltage generator just described to a triangle solver such as described in the copending application by Warren G. Proctor, for a Geometrical Computer, Serial No. 580,020, filed February 27, 1945. When supplied with voltages proportional to ground range and altitude, this triangle solver produces a D.-C. voltage proportional to slant range.

The voltage appearing across crystals 18 and 20 is applied to a differentiator 22, which may consist of a conventional resistance-capacitance peaker followed by a one-stage amplifier which acts as a buffer. The output of differentiator 22 is applied to a second differentiator 24, which may be of exactly the same type as differentiator 22. Differentiator 24 supplies the input voltage for an amplifier 26, which may be a single stage or a multi-stage amplifier including a cathode follower output stage. The output of amplifier 26 is available at terminals 28.

When the circuit of Fig. 1 is in operation, sawtooth generator 10 and D.-C. voltage generator 12 supply their voltages to crystals 18 and 20. The variation of impedance with current for a single crystal is shown in Fig. 2. If two crystals are connected in parallel in the manner described above, the curve of impedance versus current will be as shown in Fig. 3. It can be seen that there is a steady current through the crystal combination due to the output of generator 12. In addition there will be a current in the opposite direction due to sawtooth generator 10. This latter current will be very nearly sawtooth in shape, since the impedance of the crystal pair is small compared to resistors 14 and 16. Since the peak value of the voltage from sawtooth generator 10 is equal to or greater than the D.-C. voltage from generator 12, the resultant current through the crystal combination passes through zero at a time when the value of sawtooth voltage is equal and opposite to that of the D.-C. voltage produced by generator 12.

If the voltage across the crystals is plotted with respect to time, the result is the curve shown in Fig. 4. The inflection in the curve occurs at a time when the current through the crystal pair is zero. This inflection is due to the high impedance of the crystals when their current is zero as shown in Fig. 3. Therefore, since the slope of the sawtooth wave is linear, this inflection point is delayed with respect to the beginning of the sawtooth wave by an amount proportional to the magnitude of the D.-C. voltage from generator 12. The result of differentiating the voltage across the crystals is shown by the waveform of Fig. 5. After being differentiated a second time, the waveform becomes as shown in Fig. 6. To increase the magnitude of this voltage the output of the second differentiator 24 is applied to amplifier 26. If the output stage of amplifier 26 is a cathode follower, the input impedance thereof is high, while the output impedance appearing across terminals 28 will be low. The negative portion of the waveform of Fig. 6 may be used as the output pulse, which may if desired be used to produce the indication of computed range previously referred to.

While there has been described what is at present considered to be the preferred embodiment of the invention, it will be obvious to those skilled in the art that various changes and modifications may be made therein without departing from the scope of the invention as set forth in the appended claims.

The invention claimed is:

1. A voltage pulse generator including: a sawtooth generator; a direct current voltage generator; two impedance means having a common terminal and forming a series connection between one output terminal of said sawtooth generator and one output terminal of said direct current voltage generator; two rectifying crystals respectively having low and high impedance directions, said crystals forming a parallel circuit with the low and high impedance terminals of one of said crystals being respectively connected to the high and low impedance terminals of the other of said crystals, said parallel crystal circuit being connected between said common terminal of said two impedance means and another terminal common to both said sawtooth generator and said direct current voltage generator; first differentiating means having an input supplied by the voltage across said parallel crystal circuit; second differentiating means connected to be responsive to the output of said first differentiating means; and means for amplifying the output of said second differentiating means.

2. A voltage pulse generator comprising a source of linearly increasing current; a source of direct current; two crystal rectifiers connected as a unit in parallel with said two respective sources so as to pass as a unit the current difference of said two sources, said rectifiers having a voltage change thereacross from a first substantially constant value to a second substantially constant value at a time corresponding to zero current therethrough; and means connected to said rectifiers and responsive to said voltage change for deriving a voltage pulse coincident with said voltage change.

3. A voltage pulse generator according to claim 2, wherein said means responsive to said voltage change comprises voltage differentiating means.

4. A voltage pulse generator comprising: a source of linearly increasing current; a source of normally constant direct current that is adapted to be varied; two crystal rectifiers connected as a unit in parallel with said source of direct current and said source of linearly increasing current so as to pass as a unit the current difference of said two sources; first differentiating means connected to said crystal rectifiers; second differentiating means connected to said first differentiating means; and signal translating means connected to said second differentiating means.

5. A voltage pulse generator including: a sawtooth generator; a direct current voltage generator; two impedance means having a common terminal and forming a series connection between one output terminal of said sawtooth generator and one output terminal of said direct current voltage generator; two rectifying crystals respectively having low and high impedance directions, said crystals forming a parallel circuit with the low and high impedance terminals of one of said crystals being respectively connected to the high and low impedance terminals of the other of said crystals, said parallel crystal circuit being connected between said common terminal of said two impedance means and another terminal common to both said sawtooth generator and said direct current voltage generator; and differentiating means having an input supplied by the voltage across said parallel crystal circuit.

6. A voltage pulse generator comprising a source of linearly increasing current; a source of direct current; two rectifier means connected as a unit in parallel with said two respective sources so as to pass as a unit the current difference of said two sources, said rectifier means having a voltage change thereacross from a first substantially constant value to a second substantially constant value at a time corresponding to zero current therethrough; and means connected to said rectifier means and responsive to said voltage change for deriving a voltage pulse coincident with said voltage change.

LEON BESS.

REFERENCES CITED

The following references are of record in the file of this patent:

UNITED STATES PATENTS

| Number | Name | Date |
| --- | --- | --- |
| 2,139,467 | Roosenstein | Dec. 6, 1938 |
| 2,173,925 | Tuxen | Sept. 26, 1939 |
| 2,250,708 | Herz | July 29, 1941 |
| 2,427,687 | Norgaard | Sept. 23, 1947 |